United States Patent [19]
Kreuzer et al.

[11] 3,853,311
[45] Dec. 10, 1974

[54] SHOCK ABSORBER FOR AUTOMOBILE BUMPER

[75] Inventors: Dieter Kreuzer; Dieter Lutz, both of Schweinfurt am Main, Germany

[73] Assignee: Fichtel & Sachs AG, Schweinfurt am Main, Germany

[22] Filed: Feb. 20, 1973

[21] Appl. No.: 333,978

[30] Foreign Application Priority Data
Feb. 26, 1972 Germany............................ 2209158

[52] U.S. Cl................. 267/64 R, 267/116, 293/70, 188/288, 188/316
[51] Int. Cl. .......................... F16f 9/346, B60r 19/06
[58] Field of Search ............ 293/70, 85, 86; 213/43; 188/286, 288, 289, 316, 317; 267/64 R, 116

[56] References Cited
UNITED STATES PATENTS

| | | | |
|---|---|---|---|
| 999,871 | 8/1911 | Rector................................. | 188/317 |
| 1,829,430 | 10/1931 | Yevseyeff........................... | 188/317 |
| 2,348,160 | 5/1944 | Thornhill............................. | 188/317 |
| 3,003,595 | 10/1961 | Patriquin ............................ | 188/289 |
| 3,656,632 | 4/1972 | Karakashian et al. .............. | 188/317 |
| 3,693,768 | 9/1972 | Erdmann ............................ | 188/289 |

Primary Examiner—M. Henson Wood, Jr.
Assistant Examiner—Robert Saifer
Attorney, Agent, or Firm—Hans Berman; Kurt Kelman

[57] ABSTRACT

In a telescoping shock absorber, the flow section of the throttling passage between two fluid-filled compartments is determined by an axial slot in a sleeve bounding a conduit between the two compartments. The slot constitutes the orifice of the conduit in one of the compartments, and is axially defined at one end by a partition which separates the two compartments and is attached to one of the two telescoping members of the shock absorber, the sleeve being attached to the other member so that the size of the orifice is reduced when the shock absorber is shortened by an applied force.

9 Claims, 12 Drawing Figures

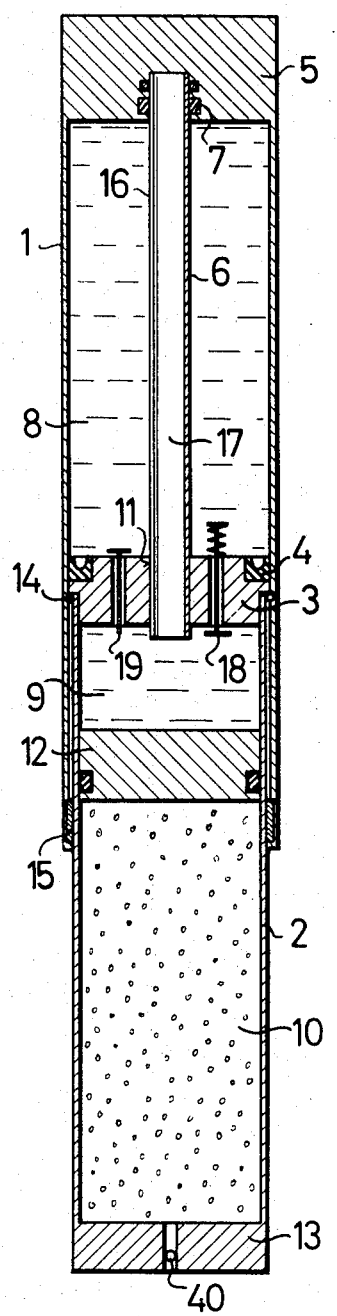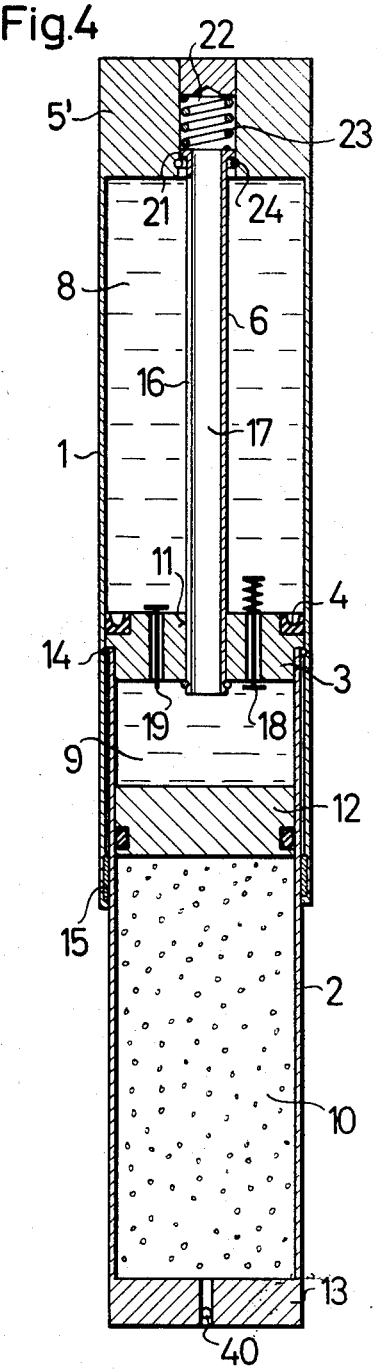

SHOCK ABSORBER FOR AUTOMOBILE BUMPER

This invention relates to shock absorbers, and particularly to a shock absorber whose characteristics make it suitable for use between the body and a bumper of an automotive vehicle in order to absorb a force applied to the bumper and to prevent its transmission to the body.

It is known from the commonly owned application Ser. No. 251,813, filed May 15, 1972, to interpose telescopic shock absorbers between the body and the bumpers of a motor car. The known shock absorbers are basically similar to the telescoping, cylinder-and-piston type shock absorbers employed in wheel suspensions, and the desired characteristics are achieved by machining a suitably contoured axial groove into the inner cylinder wall to provide a throttling conduit between the two compartments of the cylinder cavity separated by the piston. The orifice of the groove in the compartment which is under higher pressure after impact is gradually reduced in size by the travelling piston.

While shock absorbers of the afore-described type have been found effective for the intended purpose, it is relatively difficult and costly to form the required groove in the interior cylinder wall with the precision necessary for predictable performance.

It is the primary object of the invention to provide a shock absorber of the type described which can be produced at substantially lower cost than the earlier device.

With this object in view, the invention provides an elongated shock absorber having two longitudinally terminal members engaged for relative longitudinal movement between positions of maximum and minimum overall shock absorber length. The two members bound first and second, longitudinally offset chambers in the shock absorber and are biased toward the position of maximum shock absorber length by yieldably resilient means.

The first chamber is longitudinally adjacent one of the two terminal members while the second chamber is adjacent the other terminal member which carries a partition longitudinally separating the chambers. A sleeve member, whose axis is substantially longitudinal of the shock absorber movably engages the partition and is secured to the one terminal member for movement therewith. Respective axial portions of the sleeve member extend in the two chambers, and the sleeve member bounds a permanently open conduit between the chambers. A portion of an axial slot in the sleeve member is longitudinally defined by the partition and constitutes the orifice of the connecting conduit in the first chamber, so that the flow section of the orifice varies during relative movement of the sleeve member and the partition. Fluid fills the chambers and the conduit under the pressure of the afore-mentioned yieldably resilient means.

Other features, additional objects, and many of the attendant advantages of this invention will readily be appreciated as the invention becomes better understood from the following detailed description of preferred embodiments when considered in connection with the appended drawing in which:

FIG. 2 shows the shock absorber of FIG. 1 in axial section on a larger scale;

FIGS. 3 and 4 show modifications of the apparatus of FIG. 2 in respective corresponding views;

Figure 10:
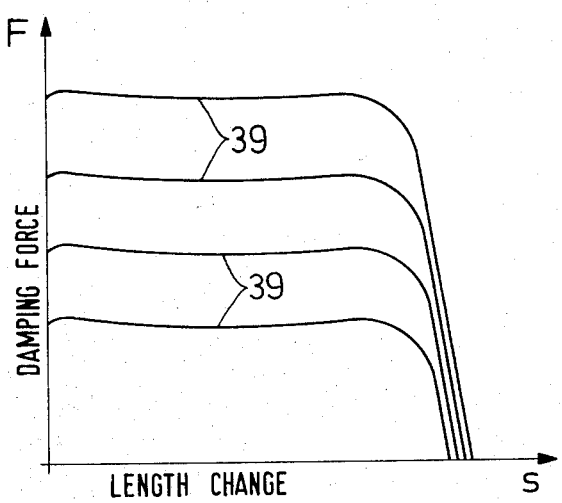
Figure 11:
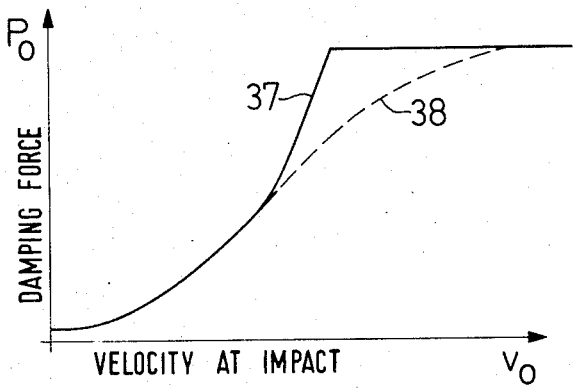

FIGS. 10 and 11 diagrammatically illustrate the performance of the shock absorbers of the invention.

Figure 1:
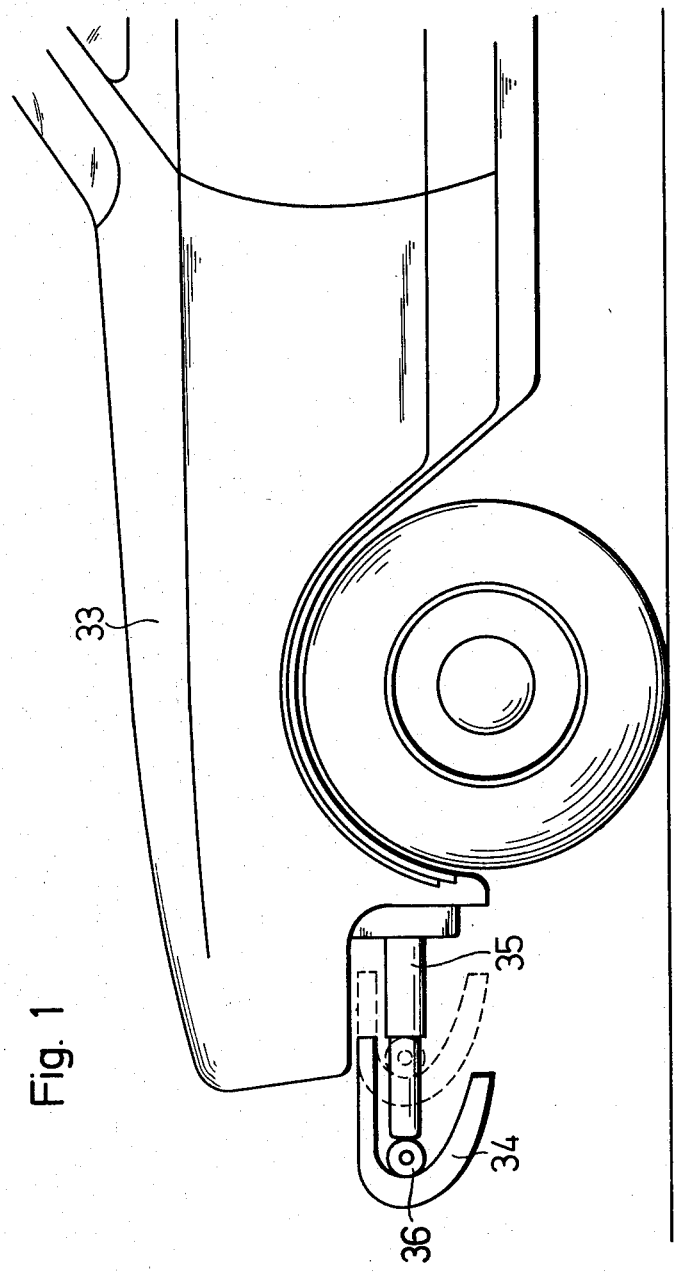
FIG. 1 is a fragmentary, side-elevational view of a motorcar equipped with a shock absorber of the invention.

Referring now to the drawing, and initially to FIG. 1, there is shown the body 33 of a motorcar whose front bumper 34 is attached to the body 33 by at least two elongated, hydraulic shock absorbers 35, only one shock absorber being seen in the drawing. The two longitudinally terminal members of each shock absorber 35 are fastened to the bumper 34 and the body 33 by fastening eyes 36, conventional in themselves, only partly seen in FIG. 1, and omitted from most other Figures.

The shock absorber 35 is shown in greater detail, but without its fastening eyes, in FIG. 2. Its two longitudinally terminal members are a cup-shaped cylinder 1 and a hollow plunger 2 coaxial with the cylinder 1 and received therein for telescoping movement. The inner axial end of the plunger 2 is substantially closed by a radial partition 3 which separates a first chamber 8 in the cylinder 1 from a second chamber 9 in the plunger 2. A sealing ring 4 on the partition 3 engages the inner face of the cylinder 1. The outer ends of the cylinder and of the plunger 2 are sealed by respective radial end walls 5, 13.

One end of a tubular sleeve 6 coaxial with the cylinder 1 and the plunger 2 is fastened in a recess of the end wall 5 and sealed to the end wall by a gasket 7. In the illustrated position of maximum shock absorber length, the sleeve 6 slidably passes through a bore 11 of the partition 3 so that only the other, open end of the sleeve 6 extends into the second chamber 9. An axial slot 16 extends over the entire length of the sleeve 6 and provides an orifice from the chamber 8 to the axial bore 17 of the sleeve 6, the width of the slot 16 being selected so that the effective flow section of the orifice part of the slot 16, downwardly defined by the partition 3 in the view of FIG. 2, is at most equal to the effective flow section of the bore 17.

A floating piston 12 in the plunger 2 axially separates a cushion 10 of compressed air or nitrogen in the outer end part of the plunger 10 from the liquid which fills the chambers 8, 9 and the permanently open conduit through the sleeve 6 which connects the chambers. The plunger 2 and cylinder 1 are movably sealed to each other and coaxially guided by a ring 14 attached to the outer face of the plunger 2 adjacent the partition 3 and by a cylindrical ring 15 attached to the inner face of the cylinder 1 at the rim of the latter remote from the end wall 5. A pressure relief valve 18 in the partition is spring-loaded to permit fluid flow from the chamber 8 into the chamber 9 under a relatively high pressure differential, and a check valve 19 in the partition opens under a pressure in the chamber 9 which is only slightly higher than that in the chamber 8. A check valve 40 in the end wall 13 permits the gas in the cushion 10 to be replenished.

The pressure of the gas 10 is transmitted to the liquid in the chambers 8, 9 by the floating piston 12 so that the shock absorber is resiliently biased toward the illustrated rest position of maximum length. Impact of the bumper 34 against an obstacle causes the shock absorber to be shortened by movement of the plunger 2 inward of the cylinder 1. The liquid in the chambers 8, 9 being incapable of significant compression, the illustrated axial spacing of the sleeve 6 and the floating piston 12 is substantially maintained while the gas 10 is being compressed so that the sleeve 6 is axially open toward the chamber 9 in all relative positions of the cylinder 1 and the plunger 2. Simultaneously, liquid flows from the contracting chamber 8 into the expanding chamber 9 through the conduit bounded by the sleeve 6, the effective flow section of the conduit being determined by the orifice portion of the slot 16 above the partition 3. This orifice portion shrinks as the shock absorber is shortened, and the damping force exerted by the liquid on the bumper 34 does not decay proportionally with the conversion of the energy of impact to thermal energy of the liquid flowing with substanatial turbulence from the chamber 8 into the chamber 9.

If the impact on the bumper 34 is more severe than can be safely dissipated by throttled liquid flow through the sleeve 6, the pressure relief valve 18 is opened to provide a secondary throttling passage between the chambers 8, 9. If this is not enough, damage to the shock absorber and to other elements of the car may be unavoidable.

After the pressure exerted on the bumper 34 by an obstacle subsides, the gas 10 can expand and restore the original condition of the shock absorber by driving liquid through the bore 17 and the slot 16 into the chamber 8. Additionally, thie check valve 19 opens to hasten expansion of the shock absorber.

The variations and modifications of the invention illustrated in FIGS. 3, 4, 5, and 5a function in substantially the same manner as will be evident from the description of their structural features.

The shock absorber illustrated in FIG. 3 in its normal, horizontal operating position has a cylinder 1 and plunger 2 not significantly different from the corresponding elements described with reference to FIG. 2. The partition 3 separates a chamber 8 in the cylinder from a chamber 9 in the plunger, but the latter extends over the full axial length of the plunger cavity and partly receives the compressed nitrogen or air cushion 10, the remainder of the chamber 9 being filled with liquid, such as hydraulic fluid or oil having an interface with the gas cushion 10, the gas and liquid also being in direct contact in the chamber 8. As not specifically illustrated A sleeve 6' having an axial slot 16 is offset downward from the common axis of the cylinder 1 and plunger 2 so that its bore 17 is filled with liquid at all times. One axial end of the sleeve 6' is provided with a radial flange 21 sealed to the end wall 5 of the cylinder 1 by an annular gasket 20 under the pressure of a helical compression spring 29 coiled about the sleeve 6' between the partition 3 and the flange 21.

The cylinder 1 and plunger 2 are guided during their coaxial, telescoping movement by rings 14, 15. A pressure relief valve 18 and a check valve 19 in the partition 3 operate as described above, and the gas in the shock absorber may be replenished through the end wall 13 of the plunger 2.

The shock absorber illustrated in FIG. 4 is partly identical with that described above with reference to FIG. 2, and the corresponding elements will not again be described. They are provided with the same reference numerals in FIG. 2.

Referring to FIG. 4, the integral end wall 5' of the cylinder 1 is provided with an outwardly plugged central bore providing a blind recess 22 open toward the chamber 8 and containing a helical compression spring 23 abuttingly interposed between the bottom of the recess 22 and a flange 21 on the sleeve 6. A retaining ring 24 near the open end of the recess 22 limits axial movement of the flange 21 and of the sleeve 6 as a whole outward of the recess 22, inward movement being limited by the compressibility of the spring 24.

Figure 8:
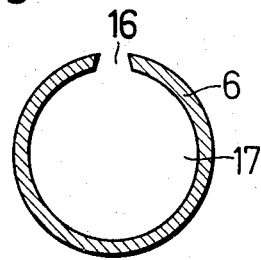
FIG. 8 shows the corresponding sleeve of the devices of FIGS. 2, 3, or 4 in plan section.

The slotted sleeves 6, 6' described above are pieces of initially flat sheet material rolled into a cylindrically arcuate shape as is best seen in FIg. 8. The contour of the slot 16 is formed prior to rolling when the flat blank is cut or stamped from a larger piece of the material.

Figure 3:
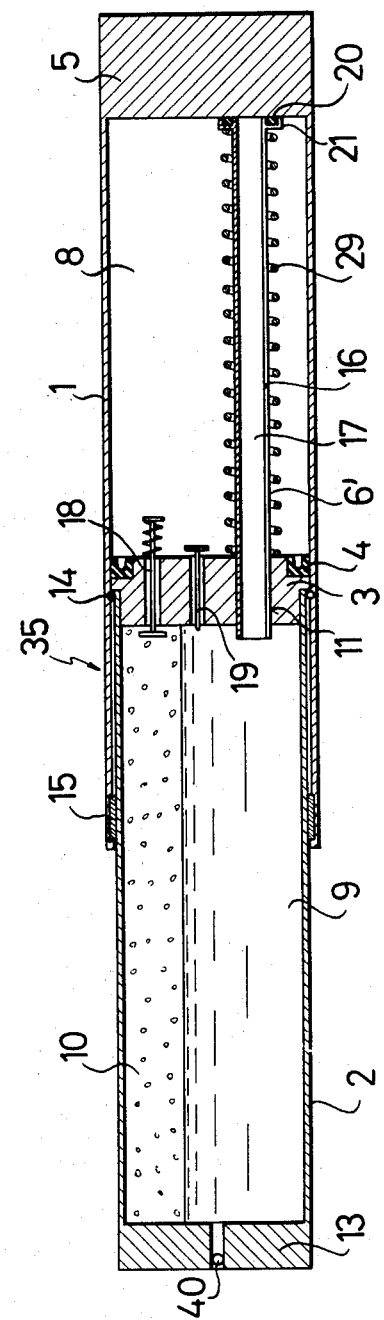
Figure 9:
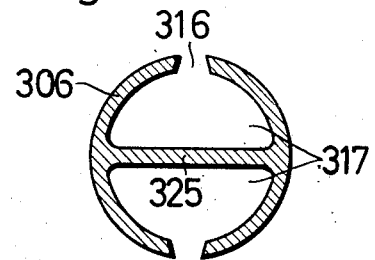
FIG. 9 illustrates a modification of the sleeve of FIG. 8.

A modified sleeve 306 suitable for use in the shock absorbers of FIGS. 2, 3, and 4 is illustrated in FIG. 9. It is made from a length of aluminum extruded through a die having the modified H-shape configuration evident from FIG. 9. The flange portions of the H-shape are cylindrically curved so as to define two slots 316 analogous to the afore-described slot 16, the two arcuate flange portions being connected by a diametrical web 325. While the extrudate shown in FIG. 9 requires some secondary machining to produce a configuration of the slots 316 other than one of uniform width, the modified sleeve 306 has greater mechanical strength than the simple sleeve 6 shown in FIG. 8 and is preferred under conditions of extreme pressure which may cause warping of the sleeve 6.

Figure 5:
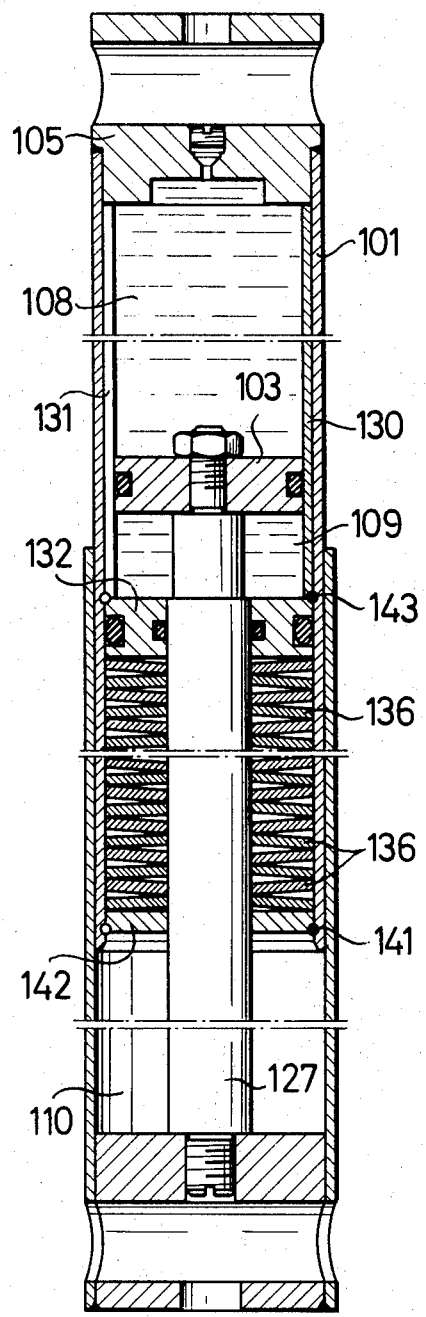
FIG. 5 shows another shock absorber of the invention in axial section.

In the modified shock absorber of the invention illustrate in FIG. 5, the two longitudinally terminal members are a cylinder 101 having an integral radial end wall 105 and a piston rod 127 carrying a piston 103 which forms a partition between chambers or compartments 108 and 109 in the cavity of the cylinder 101, the chamber 109 being partly bounded by the piston rod 127. The fastening elements which normally attach the cylinder 101 and the piston rod 127 to the bumper and the car body in the manner illustrated in FIG. 1 are partly indicated in FIG. 5.

The inner face of the cylinder 101 is lined with a sheet metal sleeve 130 slidably engaged by the piston 103 and provided with a slot 131 extending over the entire axial length of the sleeve 130 which is held in abutting engagement with the end wall 105 by a retaining ring 143 on the wall of the cylinder 101.

The piston rod 127 may move inward and outward of the cylinder cavity through an annular, radial wall 132 axially slidable in the cylinder 101 and backed by annular cup springs 136 which compress the liquid in the chambers 108, 109 and bias the piston rod 127 outward of the cylinder 101 toward the position of maximum shock abosrber length. The stack of cup springs 136 is axially secured by an annular spring seat 142, itself held in position by a retaining ring 141. A coaxial, cylindrical shroud fixedly attached to the piston rod 127 movably envelops the portion of the cylinder 101 remote from the end wall 105 to prevent entry of contaminants into the shock absorber.

Figure 6:
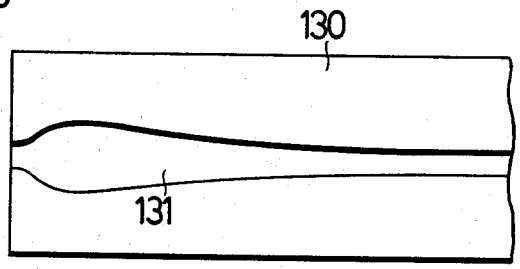
FIG. 6 is an elevational view of a slotted sleeve in the apparatus of FIG. 5.
Figure 7:
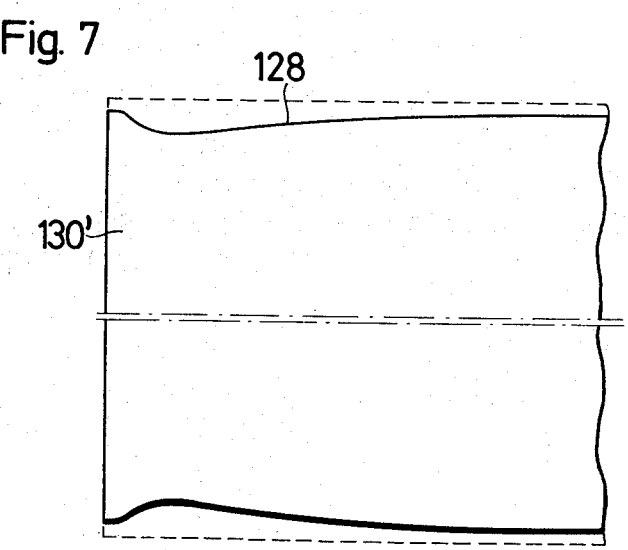
FIG. 7 shows a sheet metal blank from which the sleeve of FIG. 6 was formed.

The sleeve 130 is shown separately in FIG. 6, and the divergent/convergent contour of the slot 131 is readily apparent. The flat blank 130' from which the sleeve 130 was formed by rolling is illustrated in FIG. 7. The blank initially was a rectangular piece of sheet metal of uniform thickness, as indicated by broken lines, whose edges 128 were thereafter stamped into the wavy shape needed to produce the desired contour of the slot 131 after rolling.

Figure 5A:
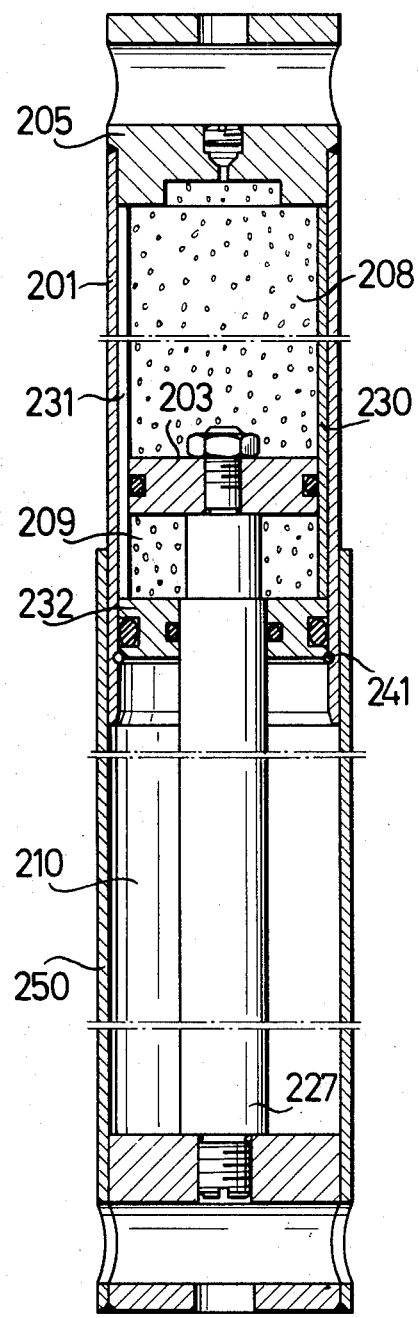
FIG. 5a illustrates a modification of the device of FIG. 5.

A modification of the shock absorber of FIG. 5 is illustrated in FIG. 5a. Its cylinder 201 has an outer, radial end wall 205, and its axial inner wall is lined with a sleeve 230 having an axial slot 231. The slot connects two compartments 208, 209 on opposite axial sides of a piston 203 on a piston rod 227. The piston rod passes axially through an annular, radial end wall 232 of the cylinder 201 which is axially secured by a retaining ring 241. An outer shroud 250 on the piston rod 227 movably envelops the cylinder 201.

The apparatus of FIG. 5a differs from that of FIG. 5 by the axially fixed position of the end wall 232. Because the available volume in the cylinder 201 varies when the piston rod 227 moves axially, the compartments 8, 9 must be filled, at least in part, with a compressible fluid such as air or nitrogen under a pressure much higher than atmospheric pressure, and the use of gas alone to the exclusion of oil or other liquid has been found to be practical with a suitably dimensioned slot 231, taking into account the low viscosity of the gas even under its prevailing high pressure. However, a mixture of liquid and gas, such as hydraulic fluid having air or nitrogen dissolved or dispersed therein, is preferred. The space 210 which surrounds the piston rod 227 in the shroud 250 thus may be open to the atmosphere.

Typical characteristics curves of the several shock absorbers of the invention are shown in FIGS. 10 and 11 in arbitrary units.

As is shown by the curves 39 in FIG. 10, the damping force with which a shock absorber of the invention resists shortening under impact remains substantially constant over the entire operating range of the shock absorber length because the orifice of the conduit in the sleeve 6, 6', 306, 130, 131 is reduced in size as the shock absorber is shortened, and the gradually decreased rate of shock absorber shortening is compensated by the decreasing effective flow section between the two compartments. The several curves of FIg. 10 are characteristic of respective velocities of impact, and the corresponding initial flow rates of fluid through the throttling conduits.

FIG. 11 diagrammatically illustrates the relationship of the initial velocity $v_o$ of the bumper relative to the vehicle upon impact and of the damping force $P_o$ with which the shock absorber resists shortening. The fully drawn curve 37 in FIG. 11 is typical of shock absorbers of the invention whose slotted sleeves are fixedly fastened to the respective cylinders, as shown in FIGS. 2, 3, 5, and 5a. The damping force rises steeply to a maximum which then is maintained constant regardless of further increase in the impact velocity. When the sleeve is capable of limited axial movement relative to the associated cylinder, as shown in FIg. 4, the maximum available damping force is approached more gradually as indicated by the broken line of curve 38.

The different shape of the curve 38 is due to the fact that the high pressure initially generated in the chamber 8 (FIg. 4) upon impact acts on the flange 21 and moves the sleeve 6 inward of the recess 22 against the restraint of the spring 24 and the relatively low fluid pressure prevailing in the chamber 9 and the bore 17. A relatively large orifice of the slot 16 is thus maintained longer than in an otherwise identical device in which limited axial movement of the sleeve relative to the cylinder is not available.

The specific dimensions of the apparatus, the viscosity of the damping fluid employed, the weight and inertia of the protected vehicle, and many other parameters influence the optimum contour of the slot which admits liquid from the first chamber to the chamber-connecting conduit in each of the several slotted sleeves of the invention. Results adequate under many conditions are achieved with slots having straight, parallel borders, but experimentation is unavoidable for determining the slot contours which produce a desired result under given conditions. The pure throttles in the shock absorbers of the invention are relatively insensitive to temperature changes.

The following formula provides a close approximation to optimum conditions:

$$F_{DR} = V_o / \sqrt{P \cdot F_K 3 \cdot 2 / \rho \cdot \zeta} - \sqrt{S \cdot \rho \cdot \zeta / F_K 3 \cdot m}$$

wherein $F_{DR}$ is the effective flow section of the connecting conduit between the two chambers, that is, the flow section of the slot above the partition 3 in FIGs. 2, 3, and 4, and the flow section of the slot 131, 132 where it is covered by the piston 103, 203 in FIGS. 5, 5a;

$V_o$ is the velocity of impact;

$P$ is the desired damping force;

$F_K$ is the effective surface of the partition or piston;

$\rho$ is the density of the hydraulic fluid;

$\zeta$ is a loss constant which is a factor of the oil quality and of the geometry of the conduit, requiring experimental determination;

$m$ is the impacting mass;

$S$ is the shock absorber stroke.

While the invention has been described with reference to specific embodiments, it should be understood that it is not limited thereto but may be practiced otherwise within the spirit and scope of the appended claims.

What is claimed is:

1. An elongated shock absorber comprising, in combination:
   a. a cylinder member having an axis and defining a sealed cavity therein;
   b. a piston rod member axially projecting from said cavity and engaging said cylinder member for relative axial movement between a first position in which the axial length of said shock absorber reaches a maximum, and a second position in which said length reaches a minimum;
   c. a piston attached to said piston rod member in said cavity and dividing said cavity into first and second axially offset chambers;
   d. yieldably resilient means biasing said members toward said first position;

e. a sleeve member lining the inner face of said cylinder member in said cavity and movably engaging said piston, respective axial portions of said sleeve member extending in said chambers,
   1. said sleeve member bounding a permanently open conduit between said chambers and being formed with an axial slot,
   2. a portion of said slot longitudinally defined by said piston constituting the orifice of said conduit in said first chamber, the flow section of said orifice varying during relative movement of said sleeve member and said piston; and
f. fluid filling said chambers and said conduit under the pressure of said yieldably resilient means.

2. An elongated shock absorber comprising, in combination:
   a. two longitudinally terminal members engaged for relative longitudinal movement between a first position in which the length of said shock absorber reaches a maximum, and a second position in which said length reaches a minimum,
      1. said members bounding first and second longitudinally offset chambers in said shock absorber,
      2. said first chamber being longitudinally adjacent one of said members, and the second chamber being longitudinally adjacent the other member;
   b. yieldably resilient means biasing said members toward said first position;
   c. a partition secured to said other member and longitudinally separating said chambers;
   d. a tubular sleeve member having an axis extending substantially longitudinally of said shock absorber and having an axial bore axially open toward said second chamber in all relative positions of said terminal members,
      1. said sleeve member movably engaging said partition and being secured to said one terminal member for movement therewith,
      2. respective axial portions of said sleeve member extendin in said chambers,
      3. said sleeve member being formed with an axially elongated slot connecting said bore to said first chamber in all relative positions of said longitudinally terminal members,
      4. a portion of said slot longitudinally defined by said partition constituting an orifice of said bore in said first chamber, the flow section of said orifice varying during relative movement of said sleeve member and said partition; and
   e. fluid filling said chambers and said bore under the pressure of said yieldably resilient means.

3. A shock absorber as set forth in claim 2, wherein said bore has an effective flow section at least equal to the effective flow section of said orifice in all relative positions of said sleeve member and of said partition.

4. A shock absorber as set forth in claim 3, further comprising securing means securing said sleeve member to said one terminal member while permitting limited longitudinal movement of said sleeve member over a distance substantially smaller than the difference between said maximum length and said minimum length, and sealing means sealing said sleeve member to said one terminal member during said limited movement thereof.

5. A shock absorber as set forth in claim 2, wherein said terminal members are tubular, said other member being received in said one member for telescoping movement and bounding said second chamber, said first chamber being contained within said one member.

6. A shock absorber as set forth in claim 2, further comprising a pressure relief valve in said partition biased toward the closed position and responsive to a pressure in said first chamber substantially greater than the pressure in said second chamber for connecting said chambers.

7. A shock abosrber as set forth in claim 6, further comprising a check valve in said partition responsive to a pressure in said second chamber higher than the pressure in said first chamber for opening a passage in said partition and connecting said chambers, the pressure difference between said chambers sufficient for opening of said passage by said check valve being much smaller than the pressure difference required for causiong said pressure relief valve to connect said chambers.

8. A shock absorber as set forth in claim 1, wherein said sleeve member is unitary piece of sheet material of uniform thickness, said slot extending over the entire axial length of said sleeve member.

9. A shock absorber as set forth in claim 2, further comprising fastening means on said terminal members for fastening the same to the body and to a bumper of an automotive vehicle respectively.

* * * * *